United States Patent [19]

Varrin et al.

[11] 3,734,456
[45] May 22, 1973

[54] VALVE WITH AXIAL SCREW ASSEMBLY

[75] Inventors: Andre J. Varrin, Oregon City; William L. McCarter, Portland, both of Oreg.

[73] Assignee: Pan American Enterprises, Portland, Oreg.

[22] Filed: June 9, 1972

[21] Appl. No.: 261,364

[52] U.S. Cl. ................................................ 251/145
[51] Int. Cl. ............................................... F16k 1/02
[58] Field of Search ...................... 251/145, 146, 147, 251/216; 29/157.1; 61/12; 137/543

[56] References Cited

UNITED STATES PATENTS

| | | | |
|---|---|---|---|
| 2,594,641 | 4/1952 | Griffith et al. | 137/543 |
| 2,925,992 | 2/1960 | Rickard | 251/145 X |
| 3,419,040 | 12/1968 | Thibodeaux | 137/543 X |

*Primary Examiner*—William R. Cline
*Attorney*—Edmond F. Shanahan

[57] ABSTRACT

A valve of the irrigation riser type, intended primarily for discharging irrigation water, under low pressure head, in controlled volume, in an annular discharge stream. The valve consists of a typical riser cylinder, with an inwardly folded annular shoulder at the upper end, and a disk closure plate adjustably supported above the annular shoulder by means of an axial screw threadably received in a spider in the interior of the riser cylinder. The spider is comprised of an assembly of several identical spider arm segments, extending outwardly and upwardly from the center of the riser cylinder, and an internally threaded bushing which is retained in place within said assembly of spider arm segments. Preferably, the riser cylinder and the spider arm segments are ferrous and welded, while the bushing is a corrosion-resistant non-ferrous material.

3 Claims, 5 Drawing Figures

PATENTED MAY 22 1973

3,734,456

VALVE WITH AXIAL SCREW ASSEMBLY

This invention relates generally to valves of the riser type, generally used for discharging an annular stream of liquid under low pressure; the usual application is in agricultural irrigation systems, in which such valves are distributed at spaced intervals along an irrigation water distributing pipe.

Irrigation pipe is subjected to rough usage in the field, and must generally be made of steel, despite the corrosion problems of steel pipe.

Irrigation pipe is disposed in an agricultural field network, through which irrigation water is periodically distributed at low pressure. At spaced intervals along the steel pipe comprising the irrigation pipe network, there are provided tee risers for the local release of irrigation water in each local zone.

It is necessary to provide an adjustable control valve at each irrigation water riser. Obviously, the irrigation valve opening must be adjusted to greater opening as the openings are spaced progressively farther downstream away from the water source. Indeed, it is necessary to be able to shut off particular zones where, for the present, no irrigation water is required. In the past, the farmer has been confronted with a choice between an inexpensive steel valve which would become corroded within a few seasons, so as to be no longer adjustable, or even movable; or to purchase a relatively expensive brass valve. Various attempts to combine brass in the valve adjustment portion, with a steel valve body, have been unsuccessful. Steel parts are best welded together, but heretofore, no satisfactory attachment of the brass parts has been available in an irrigation valve.

In the present invention, an internally threaded brass bushing is supported in a steel spider, without welding or brazing of any kind. Instead, the spider is made of three (or more) identical formed sheet steel segments, with which the brass bushing can be integrally assembled prior to welding. The bushing is retained in position by its own flanges and sets of mating notches and shoulders on both bushing and spider.

The foregoing and other objects and advantages of the invention will best be understood from the following description of a preferred specific embodiment, which description should be read with reference to the accompanying drawings, in which.

Figure 1:
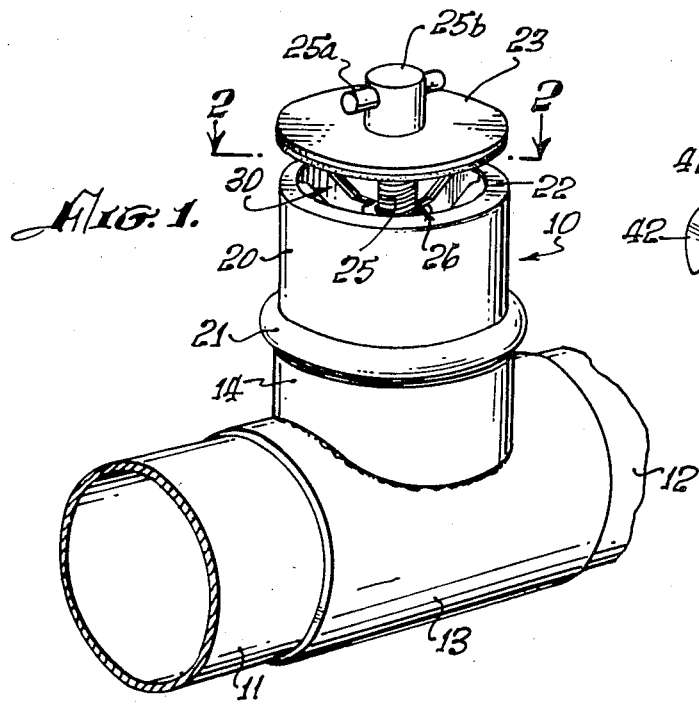
FIG. 1 is a perspective view of a valve constructed according to the invention, and welded in place on an irrigation supply conduit, the valve being illustrated in an open position.

In FIG. 1, the numeral 10 indicates, generally, a valve constructed according to the invention, and installed, typically, in an irrigation water conduit system indicated generally by the conduit sections 11 and 12.

Typically, pipe sections 11 and 12 are connected by a riser tee 13, having a water delivery riser 14, which receives valve 10. It will be understood, however, that the novelty and utility of the invention is not restricted to the particular installation illustrated in FIG. 1.

Water controlled by the valve 10 passes upwardly through a tubular valve body 20. Preferably valve body 20 is formed with an external annular shoulder 21, at approximately its mid-section, for conveniently locating and positioning valve 10 in the riser 14.

In its preferred form, valve body 20 has an inwardly projecting annular flange 22 at its upper end, flange 22 functioning as a valve seat for a closure disc 23.

Closure disk 23 is mounted co-axially on the upper end of a screw 25, which is threadably received in an internally threaded bushing 26, which is co-axially supported within valve body 20 by a spider assembly indicated generally by the numeral 30.

Spider 30 is an assembly of three formed sheet metal segments 31, 32, and 33. A single segment 31 is illustrated in perspective in FIG. 5; the other segments are identical pieces.

It is an important feature of novelty of the invention that the particular type of construction, assembly, and selection of fabrication material co-act to produce a reliable valve 10, with a minimum of production problems and a minimum percentage of production rejects.

Steel, because of its strength and excellent weldability is the preferred material for the tubular valve body 20 and the spider segments 31, 32, and 33. However, brass, or a similar corrosion-resistant material, is much preferred for the fabrication of internally threaded bushing 26. Unfortunately, the assembly of brass to steel by welding or brazing is generally a poor method of fabrication, and prone to produce a high percentage of production rejects. Thus, for example, in the valve illustrated, it might appear that the valve could be constructed with the spider 30 and the brass bushing 26 fabricated as a single brass casting. This would necessitate welding a brass spider to the internal wall surfaces of the steel valve body 20, an unreliable and unsatisfactory type of construction. Also, this type of manufacture is such that the internal threads would have to be machined after the assembly of spider 30 in the valve body 20.

Figure 4:
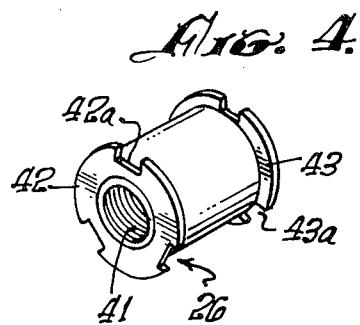
FIG. 4 is a perspective view of the non-ferrous bushing employed in the bushing and spider assembly of FIGS. 2 and 3.

In the construction of the present invention, the difficulties enumerated in the preceding paragraph are avoided, since bushing 26 is firmly retained in the spider 30 by a kind of nesting assembly, and not by welding. The bushing 26 is fabricated, as seen in FIG. 4, complete with its internal threads at 41. The ends of bushing 26 are provided with outwardly projecting flanges 42 and 43, which are notched by radial notches 42a and 43a respectively.

Figure 5:
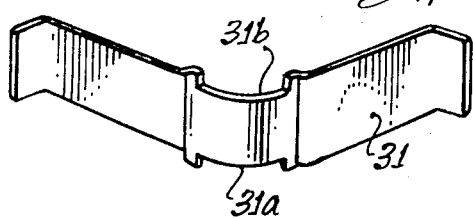
FIG. 5 is a perspective view of one of the formed sheet metal segments, three of which are welded together to construct the spider assembly seen in FIGS. 1, 2 and 3.

As may be seen in FIG. 5 each of the spider segments 31, 32, and 33, is provided with an upstream notch 31a (at the lower edge) and a downstream notch 31b (at the upper edge as illustrated). Segments 32 and 33 are correspondingly notched so that in assembly, the three segments 31, 32, and 33 may be assembled to bushing 26, as shown in the perspective view of FIG. 3, with mating notches closely receiving the adjacent portions of bushing flanges 42 and 43.

Figure 3:
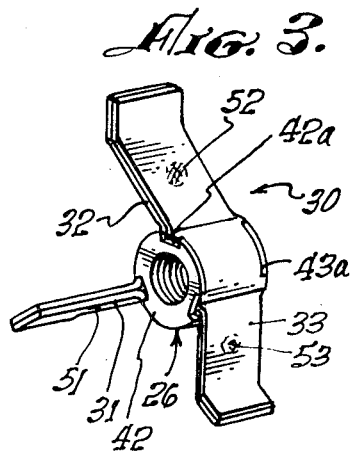
FIG. 3 is a perspective view of the bushing and spider assembly, before it has been welded in position within the valve of FIG. 1.

The assembly of FIG. 3 is held in assembly by spot welds on segments 31, 32, and 33, for example at locations 51, 52, and 53.

Figure 2:
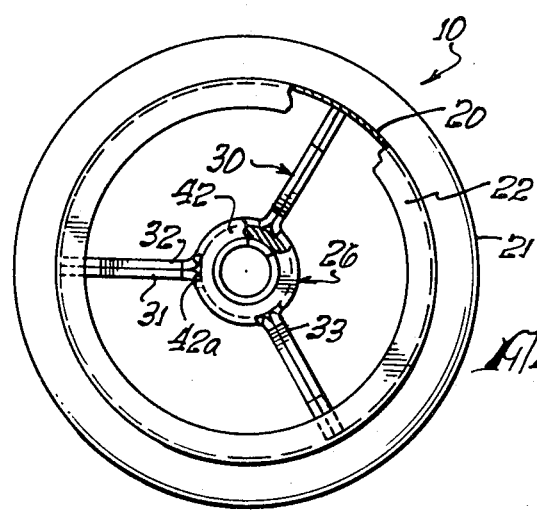
FIG. 2 is a plan view of the valve body, showing the spider and bushing assembly supported within; the shut-off disc and screw have been removed for purposes of illustration.

The assembly of FIG. 3, thus welded into a unit, is then slipped into the valve body 20 (most easily from the lower end thereof) and each of the three arms of spider 30 is welded to the interior wall surface of valve 20 as indicated at 54 in the plan view of FIG. 2.

A preferred form of construction is to fabricate the screw 25 with a manual turning crossbar 25a mounted transversely in an enlarged head 25b at its upper end.

It is preferred to fabricate screw 25 out of a corrosion-resistant and readily machinable aluminum cylindrical bar. Also, aluminum makes a practical material for the fabrication of closure disk 23.

In the preferred form of the invention illustrated, the closure disk 23 is provided with a peripheral closure surface 23a, for firmly seating on the inwardly projecting annular flange 22.

It will be understood, that the invention is not restricted to the specific materials mentioned. The essential point is that the spider segments 31, 32, and 33 be readily weldable to each other and to valve body 20, although not to the corrosion-resistant bushing 26. Generally, steel or porous materials of some kind will be best suited for valve body 20 and spider 30.

Although brass has been specifically mentioned for the bushing 26, and the screw 25, these might be fabricated, within the scope of the invention, from a suitable plastic, since they are not required to be weldable. By use of suitable welding techniques, known to those skilled in the welding art, the spot welds 51, 52, and 53 can be applied to the assembly illustrated in FIG. 3 without subjecting the bushing 26 to temperatures beyond the capacity of suitable plastic materials.

We claim:

1. A valve for upwardly discharging an annular stream of liquid in adjustable volume at low pressure, which valve includes:
   a cylindrical metal valve body for disposition as a riser cylinder with a lower upstream end for intake of liquid at low pressure, and an upwardly opening discharge end, said upper discharge end including an annular valve seat shoulder around its periphery;
   a spider assembly coaxially disposed within said valve body, said spider assembly including:
      at least three substantially identical formed sheet metal segments, formed of a metal readily weldable to the metal of said valve body, each segment consisting of a arcuate portion coaxial with the axis of said valve body, and a pair of radial arms extending from each end of said arcuate section to the internal wall surfaces of said valve body, said segments in combination providing a bushing support tube coaxial with said valve body, said tube being spaced at an elevation below said valve seat shoulder and said arms sweeping upwardly and outwardly to make contact with the internal walls of said valve body closely adjacent to the underside of said seating shoulder;
   welded attachment of said segments to said valve body and to each other;
   an internally threaded bushing supported in said bushing tube, said bushing being provided with outer surface wall projections and recesses for nesting with said spider assembly in said bushing support tube in a mating assembly therewith retaining said bushing against this assembly and against rotations;
   an axial screw threadably received in said bushing, said screw extending vertically above said discharge opening of said valve body, and said screw being provided with a valve handle rotation means at its upper end; and
   a horizontally disposed closure plate coaxially retained on said screw below said handle, said closure plate being adapted to seat on said annular valve shoulder to close said valve, or to be upwardly retracted by the unthreading of said screw to a position spaced above said valve seat for the measured flow of liquid from said valve.

2. A valve as described in claim 1 in which said valve body and said spider arm segments are of ferrous material readily weldable to each other, and said bushing is fabricated of a corrosion-resistant non-ferrous material not readily weldable to said ferrous material.

3. A valve as described in claim 1 in which said bushing is formed with an outwardly projecting annular shoulder at each end, for seating against the adjacent surfaces of said bushing support tube, and retaining said bushing against longitudinal displacement in said bushing support tube; and said annular shoulders are provided with notches mating with said radial arms of said spider assembly to retain said bushing against rotation within said bushing support tube.

* * * * *